United States Patent
Swiatek et al.

(10) Patent No.: US 9,764,289 B2
(45) Date of Patent: Sep. 19, 2017

(54) MEMBRANE SECUREMENT DEVICE

(71) Applicant: Evoqua Water Technologies LLC, Warrendale, PA (US)

(72) Inventors: Tomasz Swiatek, Baulkman Hills (AU); Michael Collignon, Annagrove (AU); Bruce Gregory Biltoft, Chatswood (AU); Robert James McMahon, Leichhardt (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 118 days.

(21) Appl. No.: 14/429,517

(22) PCT Filed: Sep. 16, 2013

(86) PCT No.: PCT/US2013/059927
§ 371 (c)(1),
(2) Date: Mar. 19, 2015

(87) PCT Pub. No.: WO2014/052071
PCT Pub. Date: Apr. 3, 2014

(65) Prior Publication Data
US 2015/0238905 A1    Aug. 27, 2015

(30) Foreign Application Priority Data

Sep. 26, 2012   (AU) ................ 2012904196

(51) Int. Cl.
*B01D 63/02* (2006.01)
*B01D 65/02* (2006.01)
*B01D 65/08* (2006.01)

(52) U.S. Cl.
CPC ......... *B01D 63/024* (2013.01); *B01D 63/022* (2013.01); *B01D 65/02* (2013.01);
(Continued)

(58) Field of Classification Search
CPC ................................ B01D 63/021
See application file for complete search history.

(56) References Cited

U.S. PATENT DOCUMENTS

| 256,008 A | 4/1882 | Leak |
|---|---|---|
| 285,321 A | 9/1883 | Tams |

(Continued)

FOREIGN PATENT DOCUMENTS

| AU | 77066/87 A | 2/1988 |
|---|---|---|
| AU | 762091 B2 | 6/2003 |

(Continued)

OTHER PUBLICATIONS

Almulla et al., "Developments in high recovery brackish water desalination plants as part of the solution to water quantity problems," Desalination, 153 (2002), pp. 237-243.

(Continued)

*Primary Examiner* — Krishnan S Menon
*Assistant Examiner* — Ryan B Huang

(57) ABSTRACT

Disclosed herein are aspects and embodiments of an apparatus for securing hollow fiber filtration membranes in a filtration module. In one example, the apparatus comprises a restraining structure engaging elongate portions of the plurality of hollow porous membrane fibers and an anchor formation engaging the plurality of hollow porous membrane fibers and positioned closer to eye portions of the plurality of hollow porous membrane fibers than at least a portion of the restraining structure. Neither the anchor formation nor the restraining structure sealingly engage open ends of the plurality of hollow porous membrane fibers.

20 Claims, 8 Drawing Sheets

(52) U.S. Cl.
CPC .......... B01D 65/08 (2013.01); *B01D 2313/02* (2013.01); *B01D 2313/54* (2013.01); *B01D 2321/185* (2013.01)

(56) References Cited

U.S. PATENT DOCUMENTS

| | | | |
|---|---|---|---|
| 403,507 A | 5/1889 | Bode |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,912,624 A | 10/1975 | Jennings |
| 3,937,015 A | 2/1976 | Akado et al. |
| 3,955,998 A | 5/1976 | Clampitt et al. |
| 3,962,095 A | 6/1976 | Luppi |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,016,078 A | 4/1977 | Clark |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,130,622 A | 12/1978 | Pawlak |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |

(56) References Cited

U.S. PATENT DOCUMENTS

| | | |
|---|---|---|
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,812,235 A | 3/1989 | Seleman et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,931,186 A | 6/1990 | Ford et al. |
| 4,933,084 A | 6/1990 | Bandel et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A * | 4/1992 | Cote .................. B01D 63/021 210/321.8 |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,728 A * | 5/1993 | Trimmer ................. B01D 53/22 128/205.11 |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,484,528 A | 1/1996 | Yagi et al. |
| 5,490,939 A | 2/1996 | Gerigk et al. |
| 5,501,798 A | 3/1996 | Al-Samadi et al. |
| 5,525,220 A | 6/1996 | Yagi et al. |
| 5,531,900 A | 7/1996 | Raghavan et al. |
| 5,552,047 A | 9/1996 | Oshida et al. |
| 5,556,591 A | 9/1996 | Jallerat et al. |
| 5,597,732 A | 1/1997 | Bryan-Brown |
| 5,607,593 A | 3/1997 | Cote et al. |
| 5,626,755 A | 5/1997 | Keyser et al. |
| 5,633,163 A | 5/1997 | Cameron |
| 5,639,373 A | 6/1997 | Mahendran et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |

(56) References Cited

U.S. PATENT DOCUMENTS

| | | |
|---|---|---|
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,036,030 A | 3/2000 | Stone et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,149,817 A | 11/2000 | Peterson et al. |
| 6,156,200 A | 12/2000 | Zha et al. |
| 6,162,020 A | 12/2000 | Kondo |
| 6,193,890 B1 | 2/2001 | Pedersen et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,383,369 B2 | 5/2002 | Elston |
| 6,387,189 B1 | 5/2002 | Groschl et al. |
| 6,402,955 B2 | 6/2002 | Ookata |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,733 B1 | 2/2003 | Nonobe |
| 6,550,747 B2 | 4/2003 | Rabie et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,623,643 B2 | 9/2003 | Chisholm et al. |
| 6,627,082 B2 | 9/2003 | Del Vecchio et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,894 B2 | 6/2004 | Bikson et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,881,343 B2 | 4/2005 | Rabie et al. |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,699 B2 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,255,788 B2 | 8/2007 | Okazaki et al. |
| 7,264,716 B2 | 9/2007 | Johnson et al. |
| 7,279,100 B2 | 10/2007 | Devine |
| 7,279,215 B2 | 10/2007 | Hester et al. |
| 7,314,563 B2 | 1/2008 | Cho et al. |
| 7,329,344 B2 | 2/2008 | Jordan et al. |
| 7,344,645 B2 | 3/2008 | Beck et al. |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |

(56) References Cited

U.S. PATENT DOCUMENTS

| | | |
|---|---|---|
| 7,510,655 B2 | 3/2009 | Barnes |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,931,463 B2 | 4/2011 | Cox et al. |
| 8,002,246 B2 | 8/2011 | Eguchi et al. |
| 8,197,688 B2 | 6/2012 | Sakashita et al. |
| 8,518,256 B2 | 8/2013 | Cox et al. |
| 8,679,337 B2 | 3/2014 | Ishibashi et al. |
| 2001/0027951 A1 | 10/2001 | Gungerich et al. |
| 2001/0052494 A1 | 12/2001 | Cote et al. |
| 2002/0027111 A1 | 3/2002 | Ando et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0159977 A1 | 8/2003 | Tanny et al. |
| 2003/0159988 A1 | 8/2003 | Daigger et al. |
| 2003/0173706 A1 | 9/2003 | Rabie et al. |
| 2003/0196955 A1 | 10/2003 | Hughes |
| 2003/0226797 A1 | 12/2003 | Phelps |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0108268 A1 | 6/2004 | Liu et al. |
| 2004/0112831 A1 | 6/2004 | Rabie et al. |
| 2004/0129637 A1 | 7/2004 | Husain et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0173525 A1 | 9/2004 | Hunniford et al. |
| 2004/0178136 A1 | 9/2004 | Taniguchi et al. |
| 2004/0188339 A1 | 9/2004 | Murkute et al. |
| 2004/0188341 A1 | 9/2004 | Zha et al. |
| 2004/0222158 A1 | 11/2004 | Husain et al. |
| 2004/0232076 A1 | 11/2004 | Zha et al. |
| 2004/0245174 A1 | 12/2004 | Takayama et al. |
| 2005/0000885 A1 | 1/2005 | Stockbower |
| 2005/0006308 A1 | 1/2005 | Cote et al. |
| 2005/0023219 A1 | 2/2005 | Kirker et al. |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1* | 6/2005 | Liu .................... B01D 63/024 210/636 |
| 2005/0121389 A1 | 6/2005 | Janson et al. |
| 2005/0126963 A1 | 6/2005 | Phagoo et al. |
| 2005/0161389 A1 | 7/2005 | Takeda et al. |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0091074 A1 | 5/2006 | Pedersen et al. |
| 2006/0151373 A1 | 7/2006 | Szabo et al. |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0273007 A1 | 12/2006 | Zha et al. |
| 2006/0273038 A1 | 12/2006 | Syed et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0075017 A1 | 4/2007 | Kuzma |
| 2007/0084791 A1 | 4/2007 | Jordan et al. |
| 2007/0084795 A1 | 4/2007 | Jordan |
| 2007/0095741 A1 | 5/2007 | Berends |
| 2007/0102339 A1 | 5/2007 | Cote et al. |
| 2007/0108125 A1 | 5/2007 | Cho et al. |
| 2007/0138090 A1 | 6/2007 | Jordan et al. |
| 2007/0163942 A1 | 7/2007 | Tanaka et al. |
| 2007/0170112 A1 | 7/2007 | Elefritz et al. |
| 2007/0181496 A1 | 8/2007 | Zuback |
| 2008/0011675 A1 | 1/2008 | Kedziora |
| 2008/0093297 A1 | 4/2008 | Gock et al. |
| 2008/0179249 A1 | 7/2008 | Beck et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0147298 A1 | 6/2011 | Kennedy et al. |
| 2011/0192783 A1 | 8/2011 | Cox et al. |
| 2012/0074053 A1 | 3/2012 | Collignon et al. |
| 2012/0091602 A1 | 4/2012 | Cumin et al. |
| 2012/0097601 A1 | 4/2012 | Lee et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0168307 A1 | 7/2013 | Drivarbekk et al. |
| 2014/0174998 A1 | 6/2014 | Aerts et al. |

FOREIGN PATENT DOCUMENTS

| | | |
|---|---|---|
| CA | 2531764 A1 | 3/2005 |
| CN | 2204898 Y | 8/1995 |
| CN | 2236049 Y | 9/1996 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |

(56) References Cited

FOREIGN PATENT DOCUMENTS

| | | |
|---|---|---|
| EP | 0012557 A1 | 6/1980 |
| EP | 0038612 B1 | 10/1981 |
| EP | 0053833 A2 | 6/1982 |
| EP | 0090383 A2 | 10/1983 |
| EP | 126714 A2 | 11/1984 |
| EP | 194735 A2 | 9/1986 |
| EP | 250337 A1 | 12/1987 |
| EP | 327025 A1 | 8/1989 |
| EP | 344633 A1 | 12/1989 |
| EP | 407900 A2 | 1/1991 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 A1 | 7/1994 |
| EP | 627255 A1 | 12/1994 |
| EP | 395133 A1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1156015 A1 | 11/2001 |
| EP | 1236503 A1 | 8/2004 |
| EP | 1466658 A1 | 10/2004 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 A | 7/1992 |
| JP | 04187224 A | 7/1992 |
| JP | 4-256425 A | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |

(56) References Cited

FOREIGN PATENT DOCUMENTS

| | | |
|---|---|---|
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004050011 A | 2/2004 |
| JP | 2004073950 A | 3/2004 |
| JP | 2004-230287 | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004337730 A | 12/2004 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| TW | 216773 B | 12/1993 |
| TW | 347343 | 12/1998 |
| WO | 8501449 A1 | 4/1985 |
| WO | 8605116 A1 | 9/1986 |
| WO | 8605705 A1 | 10/1986 |
| WO | 9302779 A1 | 2/1993 |
| WO | 9629142 A1 | 9/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |

(56) References Cited

FOREIGN PATENT DOCUMENTS

| WO | 9853902 A1 | 12/1998 |
|---|---|---|
| WO | 9901207 A1 | 1/1999 |
| WO | 9906326 A1 | 2/1999 |
| WO | 9908773 A1 | 2/1999 |
| WO | 99-55448 A1 | 11/1999 |
| WO | 9959707 A1 | 11/1999 |
| WO | 0018498 A1 | 4/2000 |
| WO | 0021890 A1 | 4/2000 |
| WO | 0030740 A1 | 6/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0204100 | 1/2002 |
| WO | 0211867 A1 | 2/2002 |
| WO | 0226363 A2 | 4/2002 |
| WO | 0230550 A1 | 4/2002 |
| WO | 0238256 A1 | 5/2002 |
| WO | 0240140 A1 | 5/2002 |
| WO | 0247800 A1 | 6/2002 |
| WO | 0300389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2013048801 A1 | 4/2013 |
| WO | 2013049109 A1 | 4/2013 |

OTHER PUBLICATIONS

Anonymous, "Nonwoven Constructions of Dyneon™ THV and Dyneon™ HTE Fluorothermoplastics", Research Disclosure Journal, Apr. 1999, RD 420013, 2 pages.
Berg et al., "Flux Decline in Ultrafiltration Processes," Desalination, 77 (1990) pp. 101-133.
Cote et al. "A New Immersed Membrane for Pretreatment to Reverse Osmosis," Desalination, 139 (2001), pp. 229-236.
Cote et al., "Immersed Membranes Activated Sludge Process Applied to the Treatment of Municipal Wastewater," Wat. Sci. Tech. 38(4-5) (1998), pp. 437-442.
Coulson et al., "Coulson and Richardson's Chemical Engineering," 1999, vol. 1, pp. 358-364.
Crawford et al., American Water Works Association Membrane Technology Conference, "Procurement of Membrane Equipment: Differences Between Water Treatment and Membrane Bioreactor (MBR) Applications," (2003).
Cui et al., "Airlift crossflow membrane filtration—a feasibility study with dextran ultrafiltration," J. Membrane Sci. (1997) vol. 128, pp. 83-91.
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent et al., "Neural networks for long term prediction of fouling and backwash efficiency in ultrafiltration for drinking water production," Desalination 131 (2000) pp. 353-362.
Dow Chemical Company, "Filmtec Membranes—Cleaning Procedures for Filmtec FT30 Elements," Tech Facts, Online, Jun. 30, 2000, XP002237568.

EPA, Membrane Filtration Guidance Manual, Nov. 2005.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999, Chapters 2 and 5.
Judd, "The MBR Book: Principles and Applications of Membrane Bioreactors in Water and Wastewater Treatment," (2006), pp. 174-178.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system," Water Research, 37(5) Mar. 2003, pp. 1192-1197, Elsevier, Amsterdam, NL.
Lloyd, D.R. et al. "Microporous Membrane Formation via Thermally Induced Phase Separation/Solid-Liquid Phase Separation," Journal of Membrane Science, 52(3) (1990), pp. 239-261, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic," Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Miller et al., "Side Stream Air Lift MBR Development and Successful Application of a New Generation of MBR," Pollution Solutions Brochure, NORIT, The Netherlands, Apr. 2008.
Nakayama, "Introduction to Fluid Mechanics," Butterworth-Heinemann, Oxford, UK, 2000.
Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, 151 (2002), pp. 195-200.
Schematic of 4" Geyser Pump, Geyser Pump Tech. Co., Nov. 13, 2005.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwmmrw.interscience.wiley.com/eow/.
White et al., "Optimisation of intermittently operated microfiltration processes," The Chemical Engineering Journal, 52 (1993), pp. 73-77.
Wikipedia, "Seawater," available at http://en.wikipedia.org/wiki/Seawater, Jul. 15, 2007.
Yamamoto et al., "Direct Solid-Liquid Separation Using Hollow Fiber Membrane in an Activated Sludge Aeration Tank," Water Science Technology, 21 (1989), pp. 43-54.
Yoon: "Important operational parameters of membrane bioreactor-sludge disintegration (MBR-SD) system for zero excess sludge production" Water Research, 37 (2003), pp. 1921-1931, Elsevier, Amsterdam, NL.
Zenon, "Proposal for ZeeWeed® Membrane Filtration Equipment System for the City of Westminster, Colorado, Proposal No. 479-99," Mar. 2000, entire publication.

* cited by examiner

MEMBRANE SECUREMENT DEVICE

RELATED APPLICATIONS

The present application claims priority to Australian provisional application number 2012904196 titled A SECUREMENT DEVICE, filed on Sep. 26, 2012.

BACKGROUND

1. Technical Field

Aspects and embodiment disclosed herein generally relate to securement devices for hollow porous filtration membrane fibers and to methods and structures associated with such securement devices. It will be appreciated, however, that the aspects and embodiments disclosed herein are not limited to this particular field of use.

2. Discussion of Related Art

Any discussion of the prior art throughout the specification should in no way be considered as an admission that such prior art is widely known or forms part of the common general knowledge in the field.

The importance of filtration membranes for treatment of wastewater is growing rapidly. It is now well known that membrane processes can be used in an effective tertiary treatment system for wastewater including, for example, sewage and provide quality effluent. However, the capital and operating costs of such systems may in some instances be prohibitive. With the arrival of submerged membrane processes where the filtration membrane modules are immersed in a large feed tank and filtrate is collected through suction applied to the filtrate side of the membrane or through gravity feed, membrane bioreactors combining biological and physical processes in one stage promise to be more compact, efficient and economic. Due to their versatility, the size of membrane bioreactors can range from household (such as septic tank systems) to sizes appropriate for use in community and large-scale sewage treatment.

Hollow porous membrane fibers are employed in membrane filtration devices to separate contaminants, for example, particles, solids, and micro-organisms from fluids, for example, water. In use, fluid passes through the membrane fibers and particles are rejected largely on the basis of size. A driving force for moving liquid through membrane fibers is fluid pressure, with the pores of the membrane fibers excluding the particles from passing through the walls of the membranes.

SUMMARY

Aspects and embodiments disclosed herein seek to overcome or least ameliorate some of the disadvantages of the prior art or at least provide the public with a useful alternative.

In some instances, membrane fibers are filamentous in nature and may be prone to tangling within filtration environments. Membrane fiber securement devices provide a means for stabilizing the membrane fibers and, if secured at opposing ends of the membrane fibers, provide a means for setting a desired membrane fiber tension.

Membrane fiber securement devices may be comprised of resin or urethane molded into a module pot. Such membrane fiber securement devices serve the double purpose of securing the membrane fibers and sealing end portions of the membrane fibers. By sealing the membrane fibers, an impenetrable barrier is formed between incoming liquid stream to be filtered, often referred to as feed, and a filtered liquid stream, often referred to as filtrate.

Known problems exist when using resins to secure membrane fibers in a pot in a membrane fiber securement device. For example, the bond between the resin and the membrane fibers can be compromised for reasons including non-compatibility of wet fibers with the resin material, pot shrinking as the resin cures, pot expansion due to moisture take-up in the resin, pot cracking, and undesirable fiber migration through the resin while the resin is in a liquid state during formation of the module pot.

Known fiber configurations exist in which the dual function provided by a resin module pot is not necessary. For example, membrane fibers arranged in a looped configuration would not require a securement device that provided an impenetrable barrier about the looped portions of the membrane fibers because no open ends of the fiber exist within the looped portions. Hence, the use of undesirably expensive resin and the potential problems associated with resin module pots may be avoided in filtration systems utilizing such membrane fiber configurations.

Membrane fibers are often designed to last for years, often in turbulent conditions. The fibers undergo considerable buffeting from fluids, bubbles, and particulates and are designed to sway and shake in response. Resin pots are often rigid which results in a problematic interface with the flexibly swaying membrane fibers extending from them. The long term viability of the membrane fibers is compromised through wearing and breaking off of the membrane fibers at the resin pot/membrane fiber interface.

According to one aspect, there is provided a securement device for securing a plurality of hollow porous membrane fibers disposed in a looped configuration in a membrane module. The looped fiber configuration comprises an eye portion extending to an elongate portion. The securement device comprises an anchor formation engaged with the looped fiber configuration and a restraining structure engaged with the looped fiber configuration. A portion of the restraining structure is positioned closer to the elongate portion of the looped fiber configuration than the anchor formation. The plurality of hollow porous membrane fibers are not sealingly engaged by the anchor formation or the restraining structure.

In some embodiments, the looped configuration of hollow porous membrane fibers is comprised of a bundle or a skein.

In some embodiments, the anchor formation is detachably secured to a frame.

In some embodiments, the anchor formation engages the looped fiber configuration by compressive means.

In some embodiments, the anchor formation engages a portion of the restraining structure by compressive means.

In some embodiments, a portion of the anchor formation is disposed through the eye portion of the looped fiber configuration.

In some embodiments, the anchor formation comprises an elongate member extending through the eye portion of the looped configuration of the hollow porous membrane fibers.

In some embodiments, the anchor formation engages the looped fiber configuration by compressive means provided by a plurality of opposed elongate members positioned transversely of the looped configuration of the hollow porous membrane fibers so as to compress the hollow porous membrane fibers therebetween.

In some embodiments, the anchor formation engages the looped fiber configuration by compressive means provided by a ratchetable strap or detachable clip.

In some embodiments, the restraining structure engages with the looped fiber configuration by compressive means.

In some embodiments, a portion of the restraining structure engages a portion of the anchor formation by compressive means.

In some embodiments, the restraining structure is spaced from the anchor formation.

In some embodiments, the restraining structure is a sleeve.

In some embodiments, the restraining structure is flexible.

In some embodiments, the anchor formation and the restraining structure are a single integrated element.

According to another aspect, there is provided a securement device for securing a plurality of hollow porous membrane fibers in a membrane module, the plurality of hollow porous membrane fibers having an elongate portion terminating in an end portion. The securement device comprises an anchor formation engaged with the plurality of hollow porous membrane fibers proximate the end portion and a restraining structure engaged with the plurality of hollow porous membrane fibers proximate the end portion. A portion of the restraining structure is positioned closer to the elongate portion of the plurality of hollow porous membrane fibers than the anchor formation. The plurality of hollow porous membrane fibers are not sealingly engaged by the anchor formation or the restraining structure.

According to another aspect, there is provided a securement device for securing a plurality of hollow porous membrane fibers disposed in a looped fiber configuration in a membrane module. The securement device comprises a restraining structure mechanically engaging elongate portions of the plurality of hollow porous membrane fibers. The restraining structure maintains the hollow porous membrane fibers in the looped fiber configuration and maintains eye portions of the looped fiber configuration from which the elongate portions of the plurality of hollow porous membrane fibers extend. At least one open end of the plurality of hollow porous membrane fibers is positioned distal from the restraining structure. The securement device further comprises an anchor formation mechanically engaging and supporting the plurality of hollow porous membrane fibers. At least a portion of the restraining structure is disposed between the anchor formation and the elongate portions.

In some embodiments, the securement device is configured to arrange the plurality of hollow porous membrane fibers into one of a bundle and a skein.

In some embodiments, the anchor formation is detachably secured to a frame.

In some embodiments, the anchor formation compressively engages the plurality of hollow porous membrane fibers.

In some embodiments, the anchor formation compressively engages a portion of the restraining structure.

In some embodiments, a portion of the anchor formation is disposed through the eye portions of the looped fiber configuration.

In some embodiments, the anchor formation comprises an elongate member extending through the eye portions of looped fiber configuration.

In some embodiments, the anchor formation retains the plurality of hollow porous membrane fibers by application of a compressive force provided by a plurality of opposed elongate members positioned transversely of the plurality of hollow porous membrane fibers.

In some embodiments, the anchor formation further comprises one of a ratchetable strap and a detachable clip compressively retaining the plurality of hollow porous membrane fibers.

In some embodiments, the restraining structure compressively engages the plurality of hollow porous membrane fibers.

In some embodiments, a portion of the restraining structure compressively engages a portion of the anchor formation.

In some embodiments, the restraining structure is spaced from the anchor formation.

In some embodiments, the restraining structure is a sleeve.

In some embodiments, the restraining structure comprises a resilient material.

In some embodiments, the anchor formation and the restraining structure are a single integrated element.

According to another aspect, there is provided a securement device for securing a plurality of hollow porous membrane fibers having elongate portions terminating in end portions in a membrane module. The securement device comprises a restraining structure mechanically engaging elongate portions of the plurality of hollow porous membrane fibers. At least one open end of the plurality of hollow porous membrane fibers is positioned distal from the restraining structure. The securement device further comprises an anchor formation mechanically engaging and supporting the plurality of hollow porous membrane fibers proximate the end portions. At least a portion of the restraining structure disposed between the anchor formation and the elongate portions.

In some embodiments, the plurality of hollow porous membrane fibers comprises one of a bundle and a skein.

In some embodiments, the anchor formation is detachably secured to a frame.

In some embodiments, the anchor formation compressively engages the plurality of hollow porous membrane fibers.

In some embodiments, the anchor formation compressively engages a portion of the restraining structure.

In some embodiments, the anchor formation retains the plurality of hollow porous membrane fibers by application of a compressive force provided by a plurality of opposed elongate members positioned transversely of the plurality of hollow porous membrane fibers.

In some embodiments, the anchor formation further comprises one of a ratchetable strap and a detachable clip compressively retaining the plurality of hollow porous membrane fibers.

In some embodiments, the restraining structure compressively engages the plurality of hollow porous membrane fibers.

In some embodiments, a portion of the restraining structure compressively engages a portion of the anchor formation.

In some embodiments, the restraining structure is spaced from the anchor formation.

In some embodiments, the restraining structure is a sleeve.

In some embodiments, the restraining structure comprises a resilient material.

In some embodiments, the anchor formation and the restraining structure are a single integrated element.

In some embodiments, neither the anchor formation nor the restraining structure sealingly engage open ends of the plurality of hollow porous membrane fibers.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
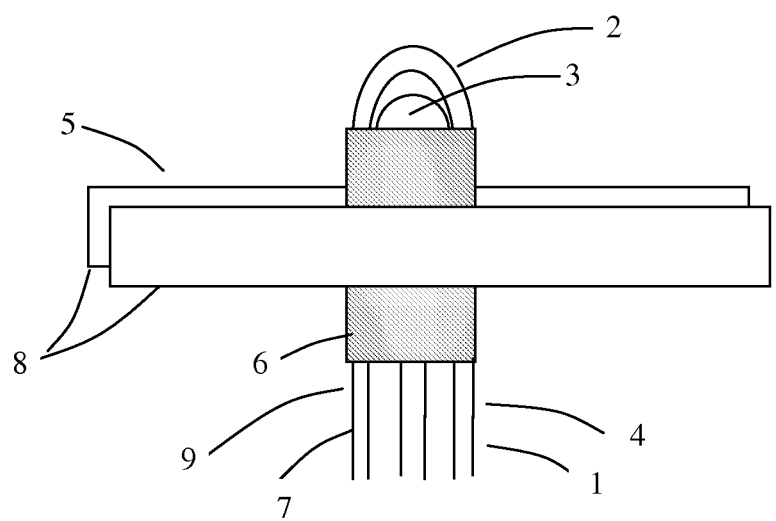
FIG. 1 is a perspective view of a securement device comprising an anchor formation and a restraining structure engaged with membrane fibers in a looped fiber configuration.

The aspects and embodiments disclosed herein are not limited in application to the details of construction and the arrangement of components set forth in the following description or illustrated in the drawings. The disclosed aspects and embodiments are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In accordance with various aspects and embodiments disclosed herein there are provided apparatus and methods of securing filtration membranes within a filtration system. The filtration membranes may be hollow fiber membranes. The hollow fiber membranes may be configured in a folded or looped configuration. As the term is used herein, a looped fiber configuration is one in which a fiber extends from a distal region to a proximal point, for example, a point at which a securement mechanism for the fiber is located, and then return from the proximal point to the distal region. In a looped fiber configuration, the fiber may fold or loop around the proximal point to form a looped end portion or eye portion. Elongate portions of the fiber may extend from the looped end portion or eye portion. Looped ends of the hollow fiber membranes may be retained in a securement device by friction or by a mechanical retaining structure or structures rather than by the use of an adhesive agent, for example, a resin or urethane used as potting material in a membrane pot. The securement device may be free of membrane securing adhesive agents, for example, resins or urethanes. The use of a mechanical structure rather than a chemical adhesive to secure the looped ends of the hollow fiber membranes in a securement device may reduce the chance for mechanical failure of the securement device due to, for example, de-lamination of the membranes from membrane potting material or cracking of the potting material. As used herein, the terms "mechanically engaging" and "mechanically supporting" fiber membranes do not include, and are exclusive of, chemically or adhesively engaging or securing fiber membranes, for example, with a membrane potting material.

Open ends of the hollow fiber membranes, for example, at least one open end of each of the hollow fiber membranes, may be secured in a membrane pot distal from the securement device for the looped ends of the hollow fiber membranes. Filtrate may be withdrawn from the open ends of the hollow fiber membranes.

A plurality of looped hollow fiber membranes may be secured within individual modular securement devices. A plurality of modular securement devices may be supported by a common support structure or frame and may be mechanically coupled to one another by the common support structure. In some embodiments, individual modular securement devices and associated filtration membranes in a filtration system may be removed or replaced as desired without a need to take the entire filtration system out of service. In some embodiments, the capacity of a filtration system may be increased as desired by the addition of further modular securement devices and associated filtration membranes.

In some embodiments a mechanical securement structure for filtration membranes may include an anchor formation which engages, is secured to, and/or is coupled to the filtration membranes through the application of a mechanical force, for example, a compressive force. In some embodiments, a restraining structure may be utilized in a securement device in addition to an anchor formation. The restraining structure may mechanically secure or restrain the membranes and/or be coupled to the membranes by the application of a mechanical force, for example, a compressive force to the membranes. The anchor formation and the restraining structure may be coupled to different portions of the filtration membranes, and/or may be coupled to at least one common portion of the filtration membranes. The anchor formation and the restraining structure may be secured to or engage one another. One of the anchor formation and the restraining structure may be disposed at least partially on an external surface of the other. One of the anchor formation and the restraining structure may be at least partially enclosed by the other.

Referring to the drawings, FIG. 1 depicts an embodiment of a securement device for securing a plurality of hollow porous membrane fibers 1 arranged in a looped fiber configuration 2. The looped fiber configuration 2 comprises an eye portion 3 defined by loops of the plurality of hollow porous membrane fibers 1. An elongate portion 4 including substantially straight portions of the plurality of hollow porous membrane fibers 1 may extend from the eye portion 3. The securement device comprises an anchor formation 5 and a restraining structure 6 engaged with or coupled to the hollow porous membrane fibers 1. A portion of the restraining structure 6 may be positioned closer to the elongate portions 4 of the hollow porous membrane fibers 1 in the looped fiber configuration 2 than the anchor formation 5 and/or may extend along a greater length of the elongate portions 4 than the anchor formation 5. The anchor formation 5 may be positioned closer to the eye portion 3 than at least a portion of the restraining structure 6. Open ends of the plurality of hollow porous membrane fibers 1 are not sealingly engaged by the anchor formation 5 or by the restraining structure 6.

FIG. 1 depicts an embodiment wherein the hollow porous membrane fibers 1 in the looped fiber configuration 2 comprise of a bundle 7 of hollow porous membrane fibers 1. It will be appreciated that alternative embodiments may include a plurality of bundles 7. In some embodiments, the looped configuration 2 may take the form of a curtain or a skein of fibers.

FIG. 1 depicts the anchor formation 5 engaging the hollow porous membrane fibers 1 in the looped fiber configuration 2 with a plurality of opposed elongate members 8. The elongate members 8 may apply a compressive force to the hollow porous membrane fibers 1 in the looped fiber configuration 2, mechanically securing the hollow porous membrane fibers 1 in place between opposed elongate members 8. The elongate members 8, which may be in the shape of planks, may be positioned transversely of the hollow porous membrane fibers 1 and may compress the hollow porous membrane fibers 1 therebetween.

The opposed elongate members 8 may be positioned to compress the elongate portions 4 of the hollow porous membrane fibers 1 in the looped fiber configuration 2, however, it will be appreciated that in alternative embodiments the eye portions 3 of the hollow porous membrane fibers 1 in the looped fiber configuration 2 may additionally or alternatively be disposed between and/or compressed and/or secured by the opposed elongate members 8 of the anchor formation 5.

FIG. 1 further depicts a restraining structure 6 engaged with the hollow porous membrane fibers 1 in the looped fiber configuration 2. The restraining structure 6 may encompass or circumscribe the elongate portions 4 of the hollow porous membrane fibers 1 in the looped fiber configuration 2. In other embodiments, the restraining structure 6 may only partially encompass or circumscribe the elongate portions 4 of the hollow porous membrane fibers 1 in the looped fiber configuration 2. The restraining structure 6 may be cylindrically shaped, and may be a sleeve or a collar. The restraining structure may be in the form of a clamp, for example a C-clamp. In other embodiments, the restraining structure 6 may encompass both the eye portions 3 and the elongate portions 4 of the hollow porous membrane fibers 1 in the looped fiber configuration 2 or just the eye portions 3.

The cylindrically shaped restraining structure 6 may be disposed on a peripheral surface 9 of the fiber bundle 7, between the opposed elongate members 8 of the anchor formation 5. The cylindrically shaped restraining structure 6 may extend beyond the anchor formation 5 in the opposed directions of the eye portions 3 and the elongate portions 4 of the hollow porous membrane fibers 1 in the looped fiber configuration 2.

In use, a portion of the restraining structure 6 may provide a cushioning or dampening effect upon the movements of the elongate portions 4 of the hollow porous membrane fibers 1. Dampened fiber movements may contribute to less fiber wear occurring at the juncture at which the elongate portions 4 of the hollow porous membrane fibers 1 in the looped fiber configuration 2 extend from the restraining structure 6 than would occur if the fiber movements were not dampened. It will be appreciated that the cushioning or dampening effect can be achieved by a restraining structure 6 that does not extend beyond the anchor formation 5 in the opposed directions of the eye portions 3 and/or the elongate portions 4 of the hollow porous membrane fibers 1 in the looped fiber configuration 2.

In some embodiments, the restraining structure 6 may be positioned on the elongate portions 4 of the hollow porous membrane fibers 1 in the looped fiber configuration 2 and spaced from the anchor formation 5, for example, at a position below a lower extent of the elongate members 8. The restraining structure 6 may be a flexible sleeve. In some embodiments, the anchor formation 5 and/or the elongate members 8 and the restraining structure 6 are the same element. In some embodiments, the cylindrically shaped restraining structure 6 is resiliently biased into compressive engagement with the hollow porous membrane fibers 1 in the looped fiber configuration 2. The restraining structure 6 may be formed from a resilient material, for example, rubber, which may have been expanded for insertion of the membrane fibers 1 within the restraining structure and then released and allowed to compressively engage the membrane fibers 1.

Figure 2:
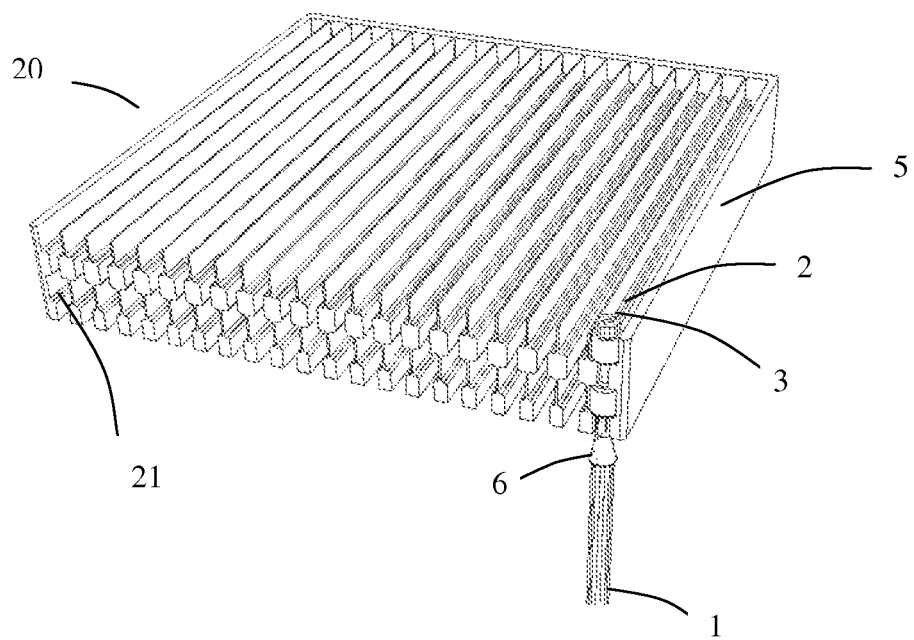
FIG. 2 is a perspective view of a securement device comprising an anchor formation and a restraining structure engaged with membrane fibers in a looped fiber configuration.

FIG. 2 depicts an alternative embodiment of a securement device comprising an anchor formation 5 supporting a restraining structure 6 engaged with hollow porous membrane fibers 1 in a looped fiber configuration 2. The embodiment of FIG. 2 includes the same elements as the embodiment depicted in FIG. 1 with additional features that make the anchor formation 5 resemble the shape of a comb 20. The plurality of opposed elongate members 8 represent the teeth of the comb 20 and are positioned in a parallel and spaced-apart relationship. The plurality of opposed elongate members 8 include surface channels 21 that extend along a lengthwise axis of the elongate members 8. The restraining structure 6 disposed on the hollow porous membrane fibers 1 in the looped fiber configuration 2 are fitted within and retained by the surface channels 21 of the opposed elongate members 8.

Figure 3:
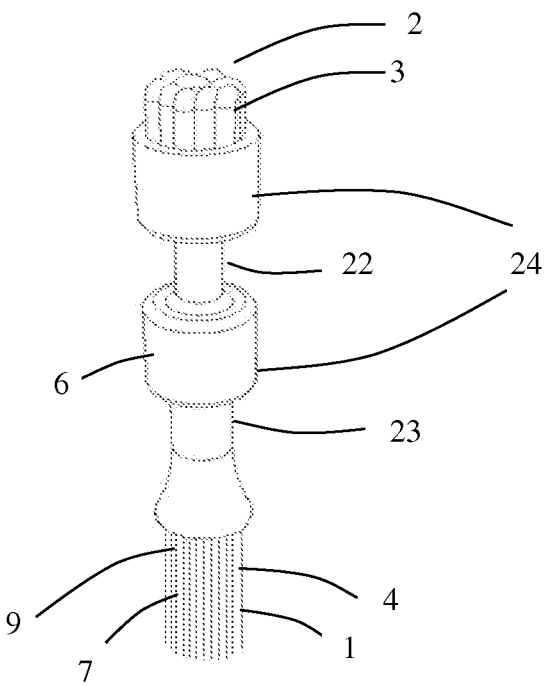
FIG. 3 is a perspective view of a restraining structure engaged with membrane fibers in a looped fiber configuration.

FIG. 3 depicts a restraining structure 6 encompassing elongate portions 4 of hollow porous membrane fibers 1 in a looped fiber configuration 2. The restraining structure 6 is cylindrically shaped and includes a distally crimped portion 22 and a proximately crimped portion 23 defining corresponding locating shoulders 24. The locating shoulders 24 are configured to engage with the plurality of surface channels 21 of the opposed elongate members 8 of the anchor formation 5.

The plurality of opposed elongate members 8 may engage and retain the restraining structure 6 and the hollow porous membrane fibers 1 in the looped fiber configuration 2 by the application of a compressive force, however, it will be appreciated that alternative engagement means are equally operable. Space restricting or interlocking means may prevent the restraining structure 6 engaged with the looped fiber configuration 2 from escaping the opposed elongate members 8 of the anchor formation 5. For example, the restraining structure 6 may be retained within the surface channels 21 of the elongate members 8 by the locating shoulders 24 which may have at least one dimension greater than a distance between adjacent opposed elongate members 8 across respective surface channels 21.

Figure 4:
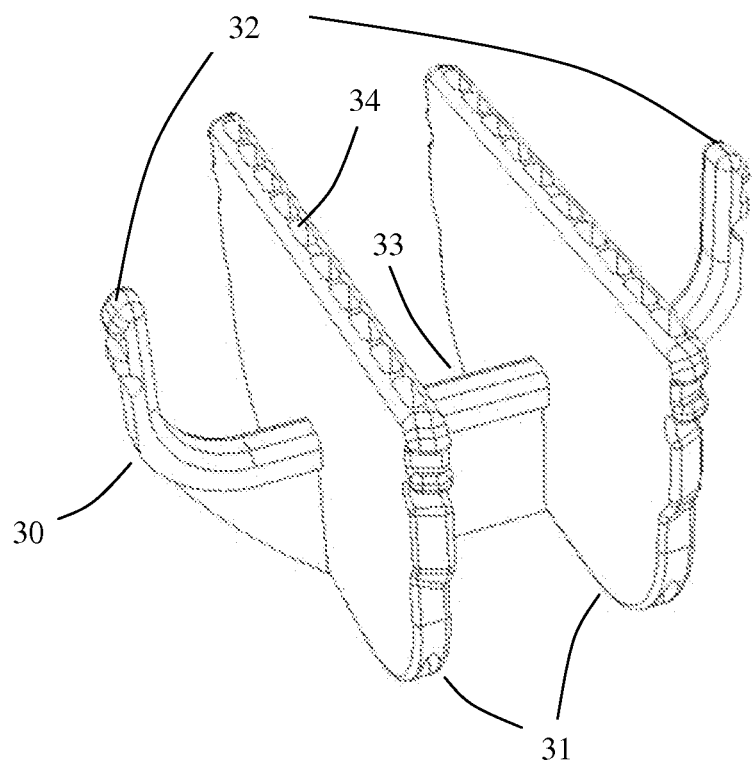
FIG. 4 is a perspective view of an anchor formation incorporating air passageways.

FIG. 4 depicts an anchor formation 5 comprising an elongate member 30 in a U-shaped configuration and two semi-oval disc formations 31. The anchor formation 5 comprises two uprights 32 connected to a base portion 33. The two semi-oval disc formations 31 are located on the U-shaped base portion 33 at evenly spaced positions between the two U-shaped uprights 32. The two semi-oval disc formations 31 are parallel to one another and project transversely and radially from the U-shaped base portion 33. The semi-oval disc formations 31 include a plurality of vertical through-holes 34. The vertical through-holes 34 may be evenly spaced and may be positioned parallel to one another. The vertical through-holes 34 may extend in the direction of the two U-shaped uprights 32. In alternate embodiments, greater of fewer than two U-shaped base portions 33 and/or two U-shaped uprights may be provided. In alternative embodiments, the disc formations 31 may be formed in other shapes than illustrated, for example, as substantially rectangular, triangular, or semi-circular formations and may be disposed at angles to one another, for example, perpendicular to one another, rather than in a parallel configuration.

Figure 5:
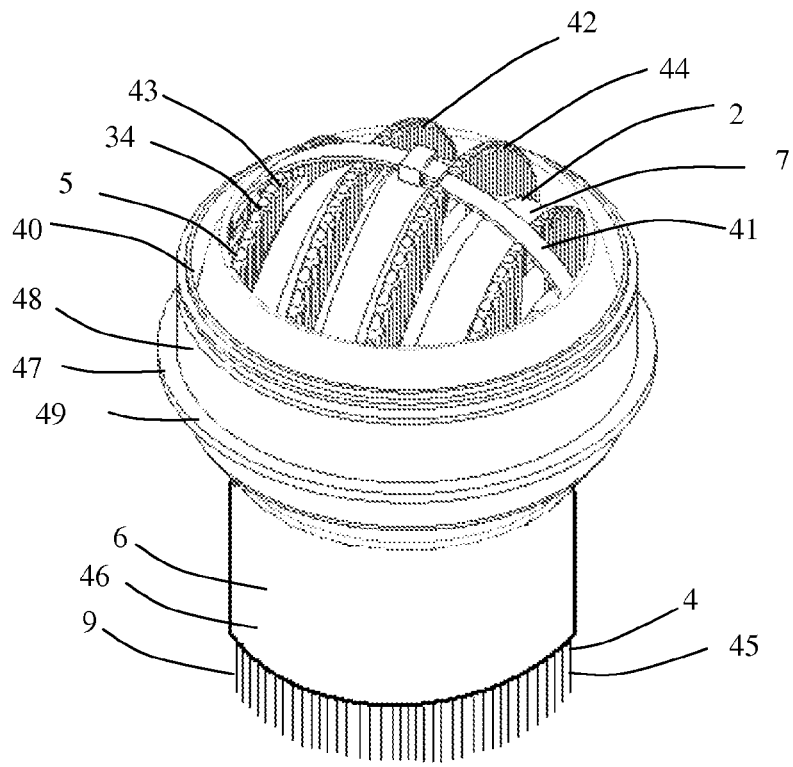
FIG. 5 is a perspective view of a securement device comprising an anchor formation incorporating air passageways, a restraining structure engaged with membrane fibers in a looped fiber configuration, and a detachable sleeve for securing to a frame.

FIG. 5 is a perspective view illustrating an embodiment of a securement device comprising an anchor formation 5, a restraining structure 6 engaged with hollow porous membrane fibers 1 in a looped fiber configuration 2, and a detachable sleeve 40 configured to be secured to a frame. The anchor formation 5 engages and secures the hollow porous membrane fibers 1 in the looped fiber configuration 2 with a cable-tie 41. It will be appreciated that the cable-tie 41 may include a ratchetable strap or a detachable clip.

FIG. 5 depicts an alternative embodiment of the anchor formation 5 of FIG. 4. In the embodiment illustrated in FIG. 5 the two semi-oval disc formations 31 are replaced by at least four semi-circular disc formations 42, in spaced apart locations, projecting transversely from the anchor formation 5. Each semi-circular disc formation 42 comprises a plurality of vertical through-holes 34 which may be positioned parallel to one another. The vertical through-holes 34 are visible as openings 43 in an arc shaped peripheral edge 44 of the semi-circular disc formations 42. In alternate embodiments, more or fewer than four semi-circular disc formations 42 may be provided and the semi-circular disc formations 42 may be formed in shapes other than that illustrated, for example, as substantially rectangular, triangular, or oval formations.

The vertical through-holes 34 of FIGS. 4 and 5 are designed for the passage of air bubbles and liquid through the semi-oval disc formations 31 and semi-circular disc formations 42, respectively, during filtration. Air bubbles and liquid may aid in dislodging particulate matter from the fibers 1 and prevent particulate matter from adhering to the fibers 1.

In FIG. 5 a portion of the anchor formation 5 is disposed through the eye portions 3 of the hollow porous membrane fibers 1 in the looped fiber configuration 2. The hollow porous membrane fibers 1 in the looped fiber configuration 2 comprise a plurality of fiber bundles 7 separated by the semi-circular disc formations 42. The plurality of fiber bundles 7 forms a single bundle 45 in the elongate portion 4 of the hollow porous membrane fibers 1 in the looped fiber configuration 2.

The cable tie 41 in the anchor formation 5 of FIG. 5 extends through the eye portions 3 (not shown) of the hollow porous membrane fibers 1 in the looped fiber configuration 2 and the elongate member 30 of the anchor formation 5. The cable-tie 41 extends transversely over the apex of the semi-circular disc formations 42 and binds the hollow porous membrane fibers 1 in the looped fiber configuration 2 to the anchor formation 5. A cylindrically shaped, flexible restraining structure 46 is positioned on a peripheral surface 9 of the fiber bundle 45. The restraining structure 46 extends over a portion (not shown) of the anchor formation 5, the cable-tie 41, and the elongate portions 4 of the hollow porous membrane fibers 1 in the looped fiber configuration 2. In alternate embodiments, the restraining structure 46 may terminate below the anchor formation 5 and/or cable-tie 41. The restraining structure 46 may be formed a resilient material, for example, rubber, and may function in a similar manner as the restraining structure 6 of FIG. 1.

The detachable sleeve 40 is configured to secure the securement device to a filtration module frame (not shown). The detachable sleeve 40 may be cylindrical and may include protruding locating shoulders 47 and recessed grooves 48 on its peripheral surface 49 to facilitate securement to a filtration module frame. The detachable sleeve 40 may include features, for example, slots, tabs, clips or other engagement features which engage with corresponding features of the elongate member 30 of the anchor formation 5.

Figure 6:
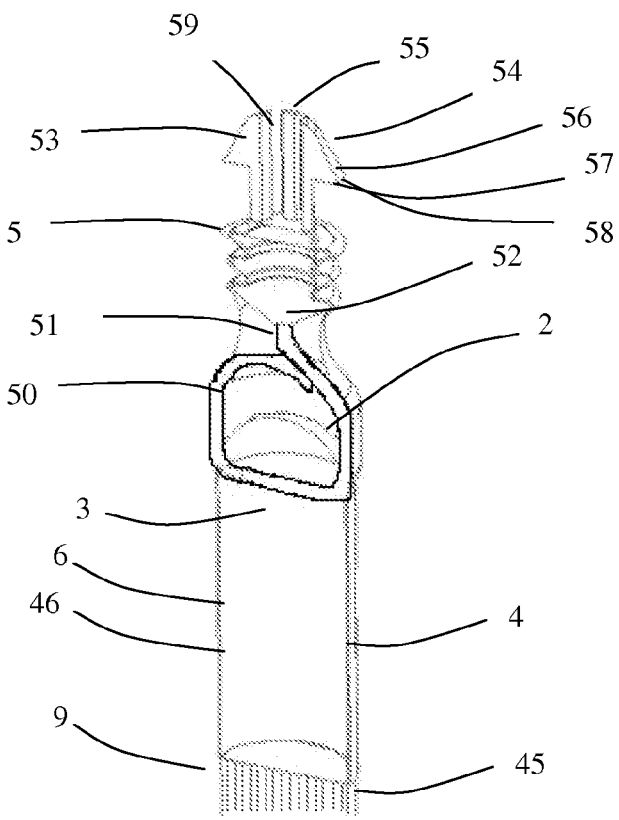
FIG. 6 is a perspective cross-sectional view of a securement device comprising an anchor formation and a restraining structure engaged with membrane fibers in a looped fiber configuration.
Figure 12:
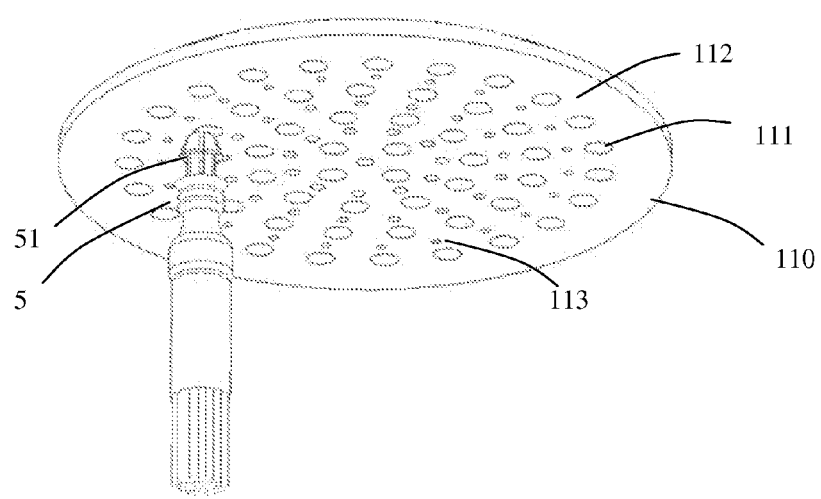
FIG. 12 is a perspective view of a securement device comprising an anchor formation and a restraining structure engaged with membrane fibers in a looped fiber configuration, and a frame to which the securement device is detachably secured.

FIG. 6 is a perspective cross-sectional view of an embodiment of a securement device comprising an anchor formation 5 and a restraining structure 6 engaged with hollow porous membrane fibers 1 in a looped fiber configuration 2. The anchor formation 5 comprises a hook formation 50 which passes through the eye portions 3 of the hollow porous membrane fibers 1 in the looped fiber configuration 2. The base portion 51 of the hook formation 50 is connected to a proximate end 52 of a male ended locking pin 53. An opposed end 54 of the male ended locking pin 52 terminates with a narrow end 55 of a truncated cone 56. A broader end 57 of the truncated cone 56 forms a shoulder 58 for engaging with a filtration module frame 110. The truncated cone 56 is transected, for example, radially bisected into sections 59 along its axis such that the truncated cone may reversibly deform into a smaller shape to facilitate insertion into a complimentary opening 111 in the filtration module frame 110 as shown in FIG. 12. In alternate embodiments, the male ended locking pin 53 may terminate in a structure shaped other than a truncated cone 56, for example, in a hemispherical structure. The male ended locking pin 53 may be formed of a resilient material which may be reversibly compressed upon application of a force pushing the male ended locking pin through an aperture or opening 111 in a filtration module frame 110. The male ended locking pin 53 may decompress or expand after passing through the opening, releaseably securing the anchor formation 5 in the filtration module frame 110.

The restraining structure 6 of FIG. 6 is deployed in a fashion similar to the restraining structure 6 of FIG. 5. The restraining structure 6 includes a cylindrically shaped, flexible restraining structure 46 positioned on a peripheral surface 9 of the fiber bundle 45. The restraining structure 6 extends over the hook formation 50, the proximate end 52 of the male ended locking pin 53, and the elongate portions 4 of the hollow porous membrane fibers 1 in the looped fiber configuration 2. In other embodiments, however, the restraining structure may terminate on or below any one of the hook formation 50, the proximate end 52 of the male ended locking pin 53, and the elongate portions 4 of the looped fiber configuration 2

Figure 7:
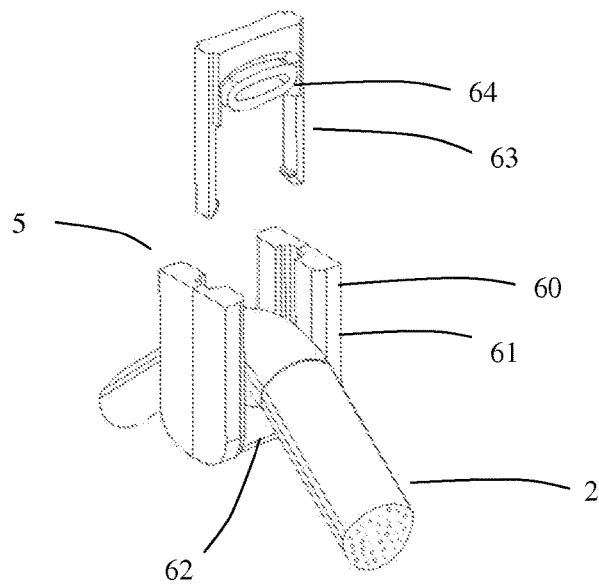
FIG. 7 is a perspective view of an anchor formation engaged with membrane fibers in a looped fiber configuration.

FIGS. 7, 8, 9, and 10 depict alternative embodiments of a securement device. FIG. 7 depicts an embodiment of an anchor formation 5 for a securement device. The anchor formation 5 comprises a U-shaped elongate member 60. The U-shaped elongate member 60 comprises two uprights 61 connected to a base portion 62. The base portion 62 of the U-shaped elongate member 60 extends through the eye portions 3 of hollow porous membrane fibers 1 in a looped fiber configuration 2. An inverted U-shaped clip 63 inserts into the U-shaped elongate member 60, thereby enclosing the eye portions 3 of the hollow porous membrane fibers 1 in the looped fiber configuration 2 between the U-shaped elongate member 60 and the U-shaped clip 63. The U-shaped clip 63 may be secured into the U-shaped elongate member 60 by one or more snaps, clips, tabs, or other securing elements which may couple to one or more complimentary securing elements on the U-shaped elongate member 60.

The inverted U-shaped clip 63 may apply a compressive force to the eye portions 3 of the hollow porous membrane fibers 1 in the looped fiber configuration 2. The fibers 1 are thus firmly secured within an aperture defined between the U-shaped elongate member 60 and the U-shaped clip 63. A cushioning element 64 may be provided at the junction between the inverted U-shaped clip 63 and the hollow porous membrane fibers 1 in the looped fiber configuration 2 for the prevention of damage to the hollow porous membrane fibers 1 which may, in some embodiments, be pressure sensitive. The cushioning element 64 may be resiliently deformable and may facilitate retaining the eye portions 3 of the hollow porous membrane fibers 1 in contact with the U-shaped elongate member 60 by applying a force biasing the membrane fibers 1 against the U-shaped elongate member 60. The cushioning element 64 may be formed integral with the U-shaped clip 63, for example, as a loop of the same material from which the remainder of the U-shaped clip 63 is formed, or as an element separate from the U-shaped clip 63. A cushioning element 64 may additionally or alternatively be included coupled to an upper surface of the base portion 62 of the U-shaped elongate member 60 between eye portions 3 of the hollow porous membrane fibers 1 in the looped fiber configuration 2 and the base portion 62 and may be formed integral with and/or from a same material as U-shaped elongate member 60 or may be an element formed separate from the U-shaped elongate member 60. In alternate embodiments, the cushioning element 64 may be omitted.

Figure 8:
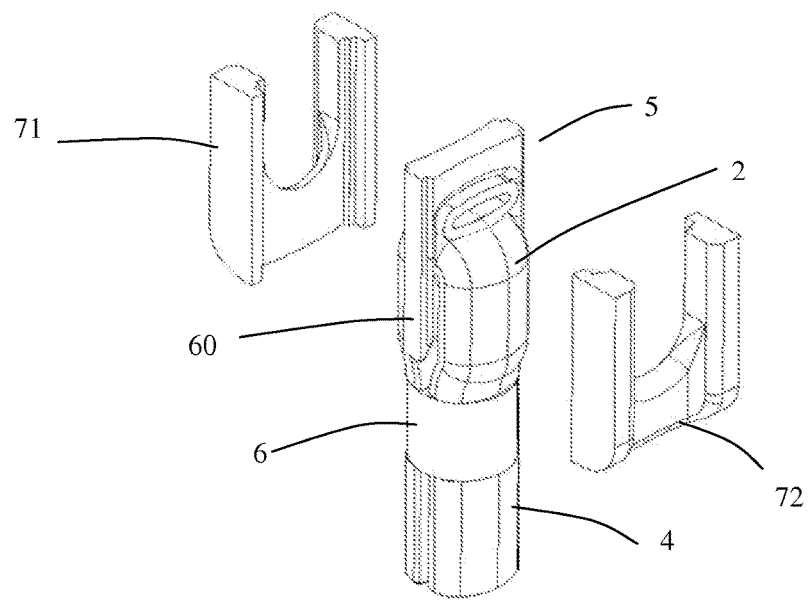
FIG. 8 is a perspective view of a securement device comprising an anchor formation and a restraining structure engaged with membrane fibers in a looped fiber configuration.

FIG. 8 depicts the embodiment of FIG. 7 wherein the anchor formation 5 comprises two additional U-shaped members 70 and 71. The two additional U-shaped members 71, 72 are positioned to align with the U-shaped elongate member 60, providing a locking mechanism for structural support. The U-shaped members 71, 72 may couple to one another and/or to the U-shaped elongate member 60 and/or U-shaped clip 63 with one or more snaps, clips, tabs, or other securing elements. A restraining structure 6 extends over the elongate portions 4 of the hollow porous membrane fibers 1 in the looped fiber configuration 2 spaced from the anchor formation 5 or, additionally or alternatively, over the U-shaped elongate member 60, U-shaped clip 63, and/or U-shaped members 71, 72. Although described and illustrated as U-shaped members, any one or more of the U-shaped elongate member 60, U-shaped clip 63, and/or U-shaped members 71, 72 may be provided having alternate shapes, for example, as substantially rectangular or arcuate members.

Figure 9:
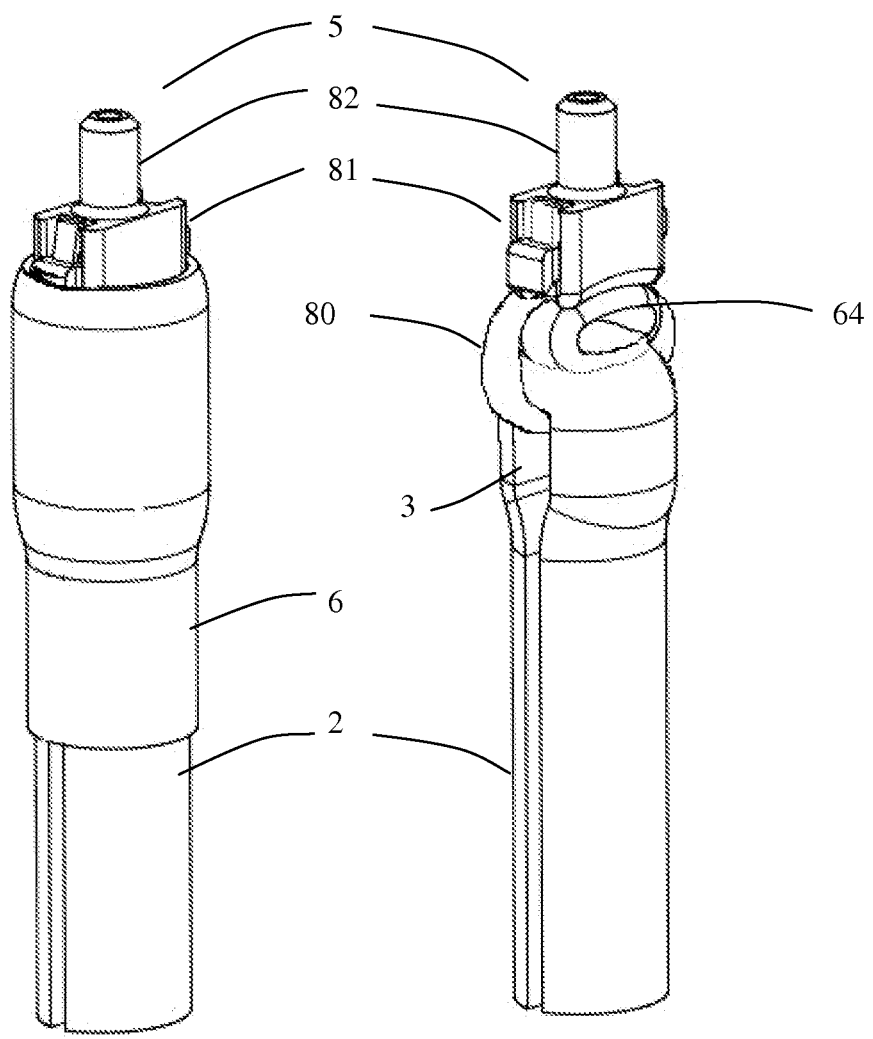
FIG. 9 is a perspective view of a securement device comprising an anchor formation and a restraining structure engaged with membrane fibers in a looped fiber configuration.

FIG. 9 depicts perspective views of an embodiment of a securement device comprising an anchor formation 5 with a restraining structure 6 engaged with hollow porous membrane fibers 1 in a looped fiber configuration 2. For ease of viewing the structure of the securement device, a second view of the securement device is provided without the restraining structure 6. The anchor formation 5 comprises a cable-tie 80 passing through the eye portions 3 of the hollow porous membrane fibers 1 in the looped fiber configuration 2 and fastened to a module frame engagement structure 81. The module frame engagement structure 81 includes a pin 82 configured for insertion into a module frame 110. A cushioning element 64 is positioned at the junction between the module frame engagement structure 81 and the hollow porous membrane fibers 1 in the looped fiber configuration 2. The cushioning element 64 may be resiliently deformable and may facilitate retaining the membrane eye portions 3 of the hollow porous membrane fibers 1 in contact with the cable-tie 80 by applying a force biasing the membrane fibers 1 against the cable-tie 80. The cushioning element 64 may be formed integral with the module frame engagement structure 81, for example, as a loop of the same material from which the remainder of the module frame engagement structure 81 is formed, or as an element distinct from the module frame engagement structure 81.

The restraining structure 6 is deployed in a fashion similar to the restraining structure 6 of FIG. 5 wherein the cylindrically shaped, flexible restraining structure 46 is positioned on a peripheral surface 9 of the fiber bundle 45. The restraining structure 6 of FIG. 9 extends over the cable-tie 80 and the eye portions 3 of the hollow porous membrane fibers 1 in the looped fiber configuration 2 and a portion of the module frame engagement structure 81. In other embodiments, the restraining structure 6 may terminate below the eye portion 3, cable-tie 80 and/or module frame engagement structure 81.

Figure 10:
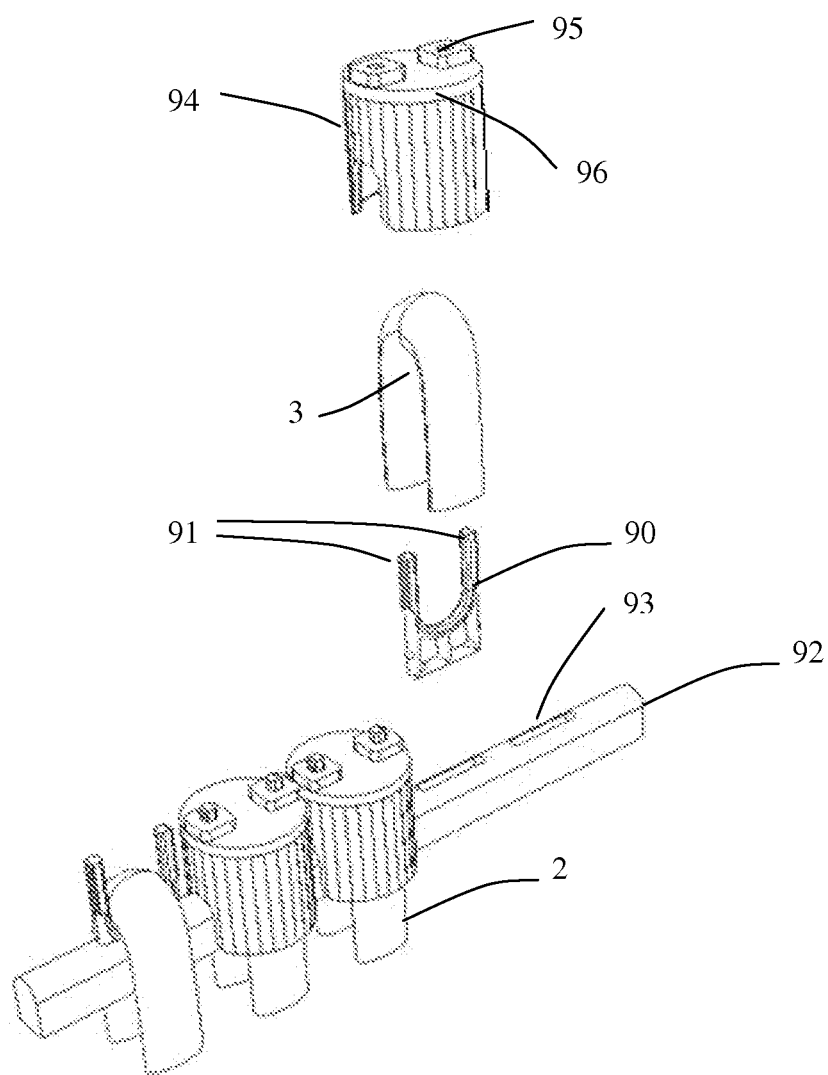
FIG. 10 is a perspective view of a securement device comprising an anchor formation and a restraining structure engaged with membrane fibers in a looped fiber configuration.

FIG. 10 is a perspective view of a securement device including a plurality of anchor formations 5. Each anchor formation 5 comprises a U-shaped member 90 including two uprights 91, and an elongate member 92 that passes through the eye portions 3 of hollow porous membrane fibers 1 in looped fiber configurations 2. The U-shaped member 90 is secured in a slot 93 within the elongate member 92 by one or more snaps, clips, tabs, or other securing elements. A cap 94 is positioned over each U-shaped member 90, eye portion 3, and elongate member 92 arrangement. The caps 94 are secured to the U-shaped members 90 by the two uprights 91 of each U-shaped member 90 protruding through openings 95 in lids 96 of the caps 94 and being fastened therein with one or more snaps, clips, tabs, or other fastening elements. In other embodiments, the uprights 91 may be secured to one or more structures internal to the caps 94 rather than, or in addition to, passing through the openings 95. The cap 94 has the rigidity to secure the arrangement and the flexibility to act as a flexible restraining structure 6 in a manner similar to that of the flexible restraining structure 6 of FIG. 9.

Figure 11:
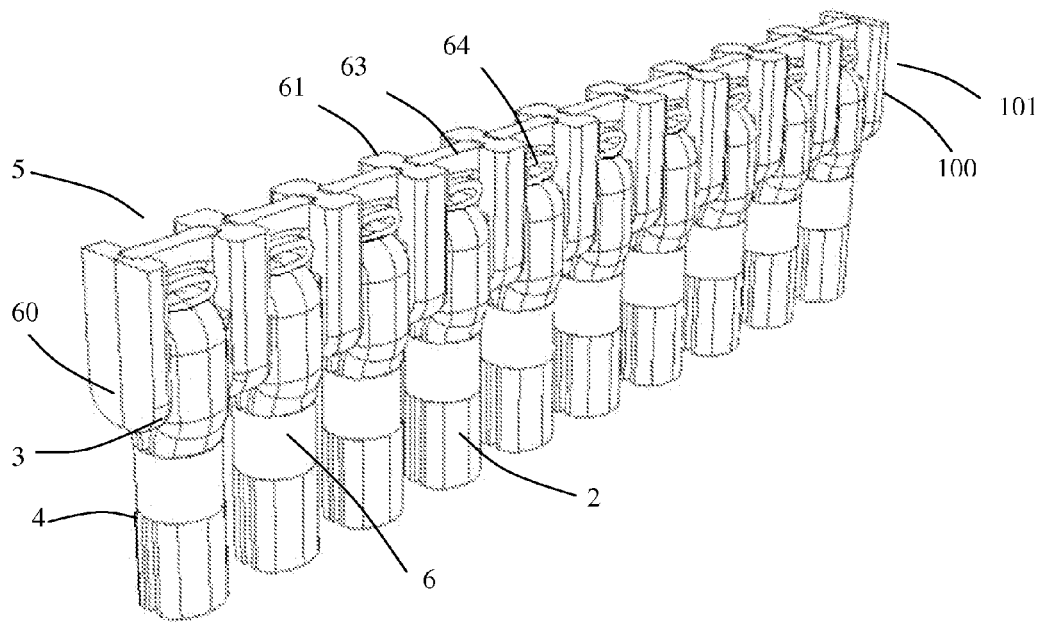
FIG. 11 is a perspective view of a securement device arranged in an array comprising a plurality of anchor formations and restraining structures engaged with membrane fibers in looped fiber configurations.

FIG. 11 is a perspective view of a securement device including a plurality of anchor formations 5 comprising the features of the anchor formation of FIG. 7. The additional feature depicted in FIG. 11 is that of the plurality of anchor formations 5 abutting one another to form an integrated single element 100. Adjacent anchor formations 5 may share common U-shaped members 71, 72 and/or may be secured to one another by snaps, clips, tabs, or other securing elements. The integrated single element 100 extends in a direction that aligns the U-shaped formations 60 such that when viewed from one end 101 of the integrated single element 100 only one U-shaped formation 60 is visible.

FIG. 12 is a perspective view of a securement device including a plurality of anchor formations 5 (only one is shown) comprising the features of the anchor formation 5 of FIG. 6, and a disc shaped frame 110. In FIG. 12 the plurality of male ended locking pins 51 are designed to be inserted into and retained by a plurality of complimentary openings 111 in a flat surface 112 of the disc shaped frame 110. The plurality of complimentary openings 111 may be evenly spaced and positioned in concentric circles within the disc shaped frame 110 or provided in a different arrangement as desired for a particular implementation. A plurality of smaller openings 113 in the disc shaped frame 110 for the passage of fluid and/or gas are evenly spaced amongst the plurality of complimentary openings 111, although the smaller openings 113 may also be provided in a different arrangement as desired for a particular implementation. The frame 110 may, in some embodiments, be other than disc shaped. For example, the frame 110 may be substantially square shaped, substantially rectangular shaped, or shaped as any other regular or irregular polygon.

Figure 13:
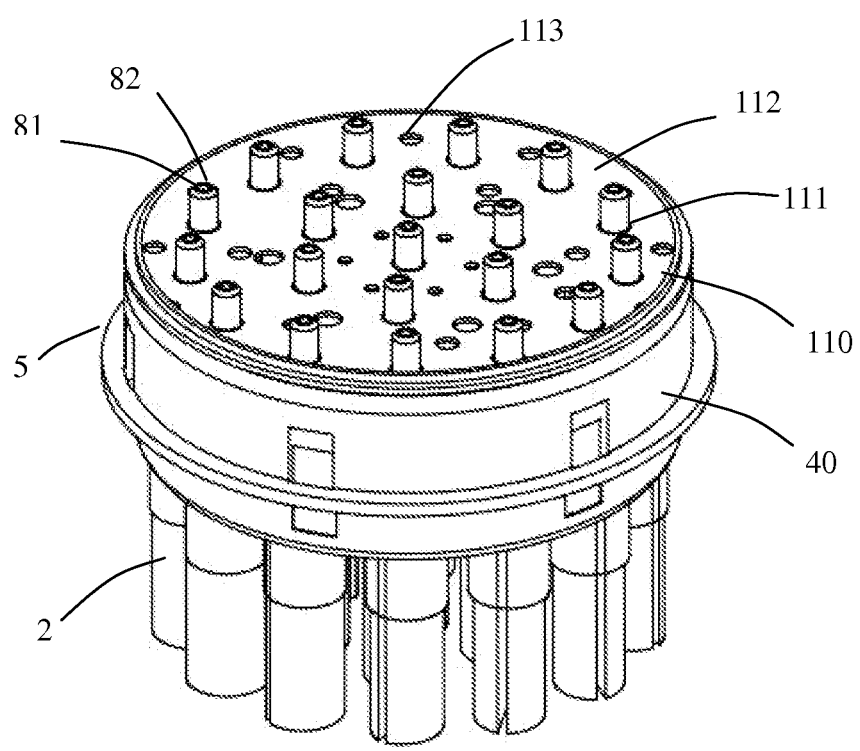
FIG. 13 is a perspective view of a securement device including a plurality of anchor formations, a disc shaped frame, and a detachable sleeve.

FIG. 13 is a perspective view of a securement device including a plurality of anchor formations 5 comprising the features of the anchor formation 5 of FIG. 9, a disc shaped frame 110, and a detachable sleeve 40 comprising the features of the detachable sleeve 40 of FIG. 5. FIG. 13 depicts the plurality of pins 82 of the module frame engagement structures 81 inserted into a plurality of complimentary openings 111 in a flat surface 112 of a disc shaped frame 110. The plurality of complimentary openings 111 are evenly spaced and positioned in concentric circles within the disc shaped frame 110. A plurality of smaller openings 113 in the disc for the passage of fluid and/or gas are evenly spaced amongst the plurality of complimentary openings 111. The openings 111 and/or the smaller openings 113 may also be provided in a different arrangement as desired for a particular implementation. The detachable sleeve 40 is positioned to engage with the disc shaped frame 110 of the securement device, for example, by disposing the disc shaped frame within a recess formed in an upper surface of the detachable sleeve. The frame 110 may, in some embodiments, be other than disc shaped. For example, the frame 110 may be substantially square shaped, substantially rectangular shaped, or shaped as any other regular or irregular polygon.

It will be appreciated that the means for connecting the plurality of male ended locking pins 51 to the disc shaped frame 110 in FIG. 12 and, in FIG. 13, the means for connecting the plurality of pins 82 to the disc shaped frame 110 could be different and still achieve the same functional purpose. For example, one or more of cable ties, pins, snaps, and/or tabs could be utilized to connect the locking pins 51 and/or pins 82 to the disc shaped frame 110. Furthermore, to prevent excessive forces caused by buffeting from air bubbles and process liquid in the filtration operation from transferring directly to the fibers 1 resulting in undesirable fiber 1 weaving, a dampening means for connecting the locking pins 51 and/or pins 82 to the disc shaped frame 110 may be provided. For example, ball and socket joints may be provided to couple the pins 51 and/or pins 82 to the disc shaped frame 110 and allow excessive forces to be dampened through the movement of the balls within the sockets of the ball and socket joints.

It will be appreciated that in the previously described embodiments the anchor formations 5 and the restraining structures 6 could be in the form of a single integrated element.

It will be appreciated that the previously described embodiments can function with hollow porous membrane fibers 1 in a non-looped fiber configuration in addition to or as an alternative to hollow porous membrane fibers 1 arranged in a looped fiber configuration 2. For example, a securement device may be provided for securing a plurality of hollow porous membrane fibers 1 having elongate portions 4 terminating in end portions. The end portions may be open or sealed closed. The securement device may comprise an anchor formation 5 engaged with the plurality of hollow porous membrane fibers 1 proximate the end portions and a restraining structure 6 engaged with the plurality of hollow porous membrane fibers 1 proximate the end portions. A portion of the restraining structure 6 may be positioned closer to the elongate portions 4 of the plurality of hollow porous membrane fibers 1 than the anchor formation 5. The anchor formation 5 may be positioned closer to the end portions than at least a portion of the restraining structure 6. The anchor formation maybe disposed between the end portions and at least a portion of the restraining structure 6. The plurality of hollow porous membrane fibers 1 may include open ends which are not sealingly engaged by the anchor formation 5 or the restraining structure 6.

Having thus described several aspects of at least one embodiment, it is to be appreciated various alterations, modifications, and improvements will readily occur to those skilled in the art. It will be appreciated that further embodiments and exemplifications are possible without departing from the spirit or scope of the aspects and embodiments described. Such alterations, modifications, and improvements are intended to be part of this disclosure, and are intended to be within the spirit and scope of the disclosed aspects and embodiments. Accordingly, the foregoing description and drawings are by way of example only.

The invention claimed is:

1. A securement device for securing a plurality of hollow porous membrane fibers disposed in a looped fiber configuration and arranged into one of a bundle and a skein in a membrane module, the securement device comprising:
a restraining structure mechanically engaging elongate portions of the plurality of hollow porous membrane fibers such that the restraining structure is positioned on a peripheral surface of the one of the bundle and the skein and encompasses at least a portion of the elongate portions of the plurality of hollow porous membranes, the restraining structure maintaining the hollow porous membrane fibers in the looped fiber configuration and maintaining eye portions of the looped fiber configuration from which the elongate portions of the plurality of hollow porous membrane fibers extend, at least one open end of the plurality of hollow porous membrane fibers positioned distal from the restraining structure; and
an anchor formation mechanically engaging and supporting the plurality of hollow porous membrane fibers, at least a portion of the restraining structure disposed between the anchor formation and the elongate portions.

2. The securement device of claim 1, wherein the anchor formation compressively engages the plurality of hollow porous membrane fibers and a portion of the restraining structure.

3. The securement device of claim 1, wherein a portion of the anchor formation is disposed through the eye portions of the looped fiber configuration.

4. The securement device of claim 3, wherein the anchor formation comprises an elongate member extending through the eye portions of the looped fiber configuration.

5. The securement device of claim 1, wherein the anchor formation retains the plurality of hollow porous membrane fibers by application of a compressive force provided by a plurality of opposed elongate members positioned transversely of the plurality of hollow porous membrane fibers.

6. The securement device of claim 1, wherein the restraining structure compressively engages elongate portions of the plurality of hollow porous membrane fibers and a portion of the anchor formation.

7. The securement device of claim 1, wherein the restraining structure is a sleeve spaced from the anchor formation.

8. The securement device of claim 7, wherein the restraining structure comprises a resilient material.

9. The securement device of claim 1, wherein the anchor formation and the restraining structure are a single integrated element.

10. A securement device for securing a plurality of hollow porous membrane fibers arranged into one of a bundle and a skein and having elongate portions terminating in end portions in a membrane module, the securement device detachably secured to a frame of the membrane module, comprising:
a restraining structure mechanically engaging elongate portions of the plurality of hollow porous membrane fibers such that the restraining structure is positioned on a peripheral surface of the one of the bundle and the skein and encompasses at least a portion of the elongate portions of the plurality of hollow porous membranes, at least one open end of the plurality of hollow porous membrane fibers positioned distal from the restraining structure; and
an anchor formation mechanically engaging and supporting the plurality of hollow porous membrane fibers proximate the end portions, at least a portion of the restraining structure disposed between the anchor formation and the elongate portions.

11. The securement device of claim 10, wherein the anchor formation is detachably secured to the frame.

12. The securement device according to claim 10, wherein the anchor formation compressively engages the plurality of hollow porous membrane fibers and a portion of the restraining structure.

13. The securement device of claim 10, wherein the anchor formation retains the plurality of hollow porous membrane fibers by application of a compressive force provided by a plurality of opposed elongate members positioned transversely of the plurality of hollow porous membrane fibers.

14. The securement device of claim 10, wherein the anchor formation further comprises one of a ratchetable strap passing through eye portions of the plurality of hollow porous membrane fibers and a detachable clip compressively retaining the plurality of hollow porous membrane fibers.

15. The securement device of claim 10, wherein neither the anchor formation nor the restraining structure sealingly engage open ends of the plurality of hollow porous membrane fibers.

16. The securement device of claim 1, wherein the anchor formation comprises a U-shaped member.

17. The securement device of claim 16, wherein the anchor formation and a second anchor formation adjacent the anchor formation share the U-shaped member.

18. The securement device of claim 1, wherein the anchor formation further comprises an elongate member configured to secure a U-shaped member within the elongate member.

19. The securement device of claim 11, wherein the anchor formation comprises a pin configured to attach to an opening in the frame.

20. The securement device of claim 11, wherein the anchor formation comprises a detachable sleeve configured to attach to the frame.

* * * * *